Figure 6:
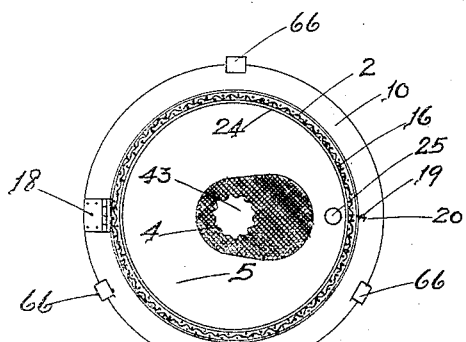
Figure 7:
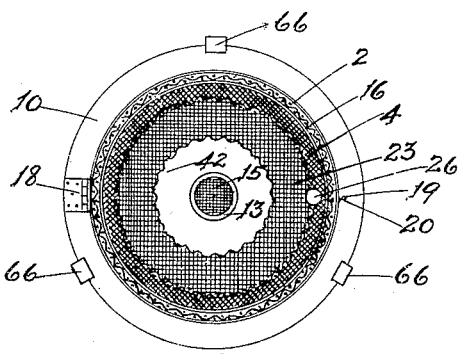
Figure 8:
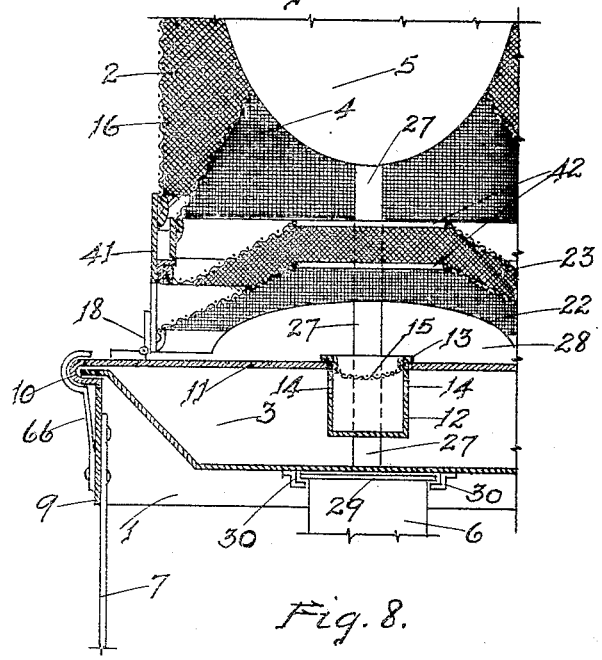
Figure 9:
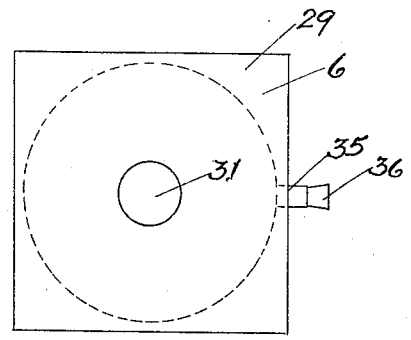
Figure 10:
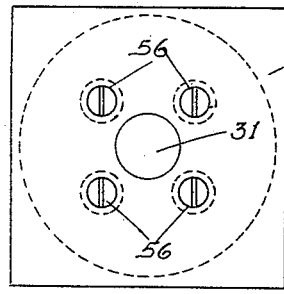
Figure 11:
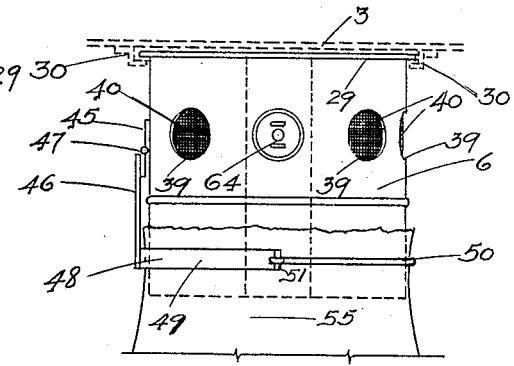

Dec. 6, 1932. C. L. JACKSON 1,890,116
INSECT DESTROYING DEVICE
Filed Nov. 18, 1931 3 Sheets-Sheet 1
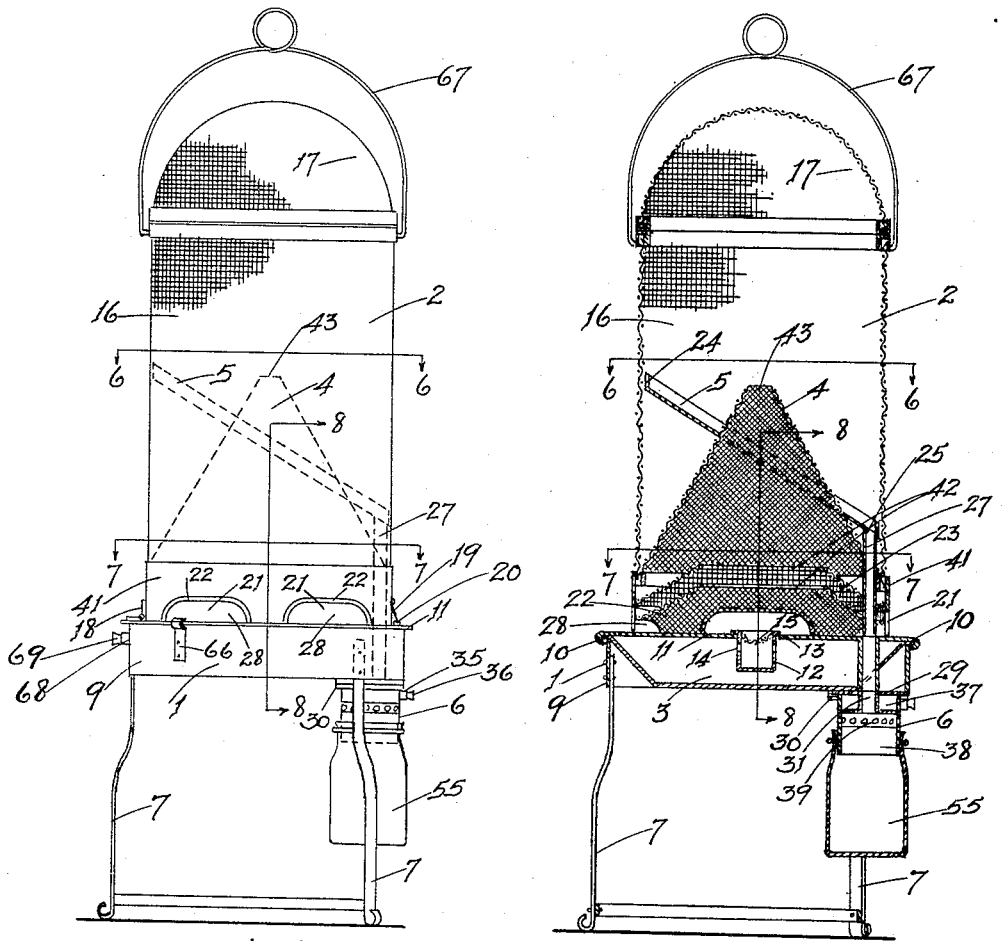
Fig. 1.
Fig. 2.
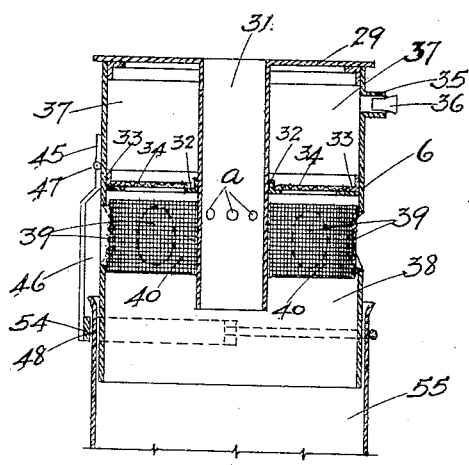
Fig. 3.
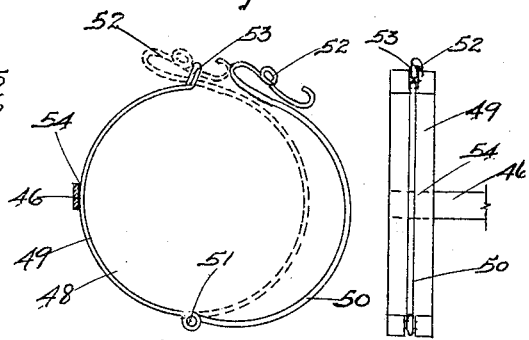
Fig. 4. Fig. 5.
INVENTOR
Charles L. Jackson.
BY E. E. Rodebaugh
ATTORNEY Dec. 6, 1932.   C. L. JACKSON   1,890,116
INSECT DESTROYING DEVICE
Filed Nov. 18, 1931   3 Sheets-Sheet 2

INVENTOR
Charles L. Jackson.
BY
ATTORNEY

Dec. 6, 1932.     C. L. JACKSON     1,890,116
INSECT DESTROYING DEVICE
Filed Nov. 18, 1931     3 Sheets-Sheet 3

INVENTOR
Charles L. Jackson.
BY
ATTORNEY

Patented Dec. 6, 1932

1,890,116

UNITED STATES PATENT OFFICE

CHARLES L. JACKSON, OF CHULA VISTA, CALIFORNIA

INSECT DESTROYING DEVICE

Application filed November 18, 1931. Serial No. 575,805.

My invention relates to improvements in insect destroying devices in which there is a trapping device or devices and a lethal chamber in which the trapped insects are killed or destroyed, so that they are unable to escape from the device, but are retained in a receptacle until such time as they may be removed from the device.

I attain these objects by the structure illustrated in the accompanying drawings in which:

Fig. I is an elevational view of my device; Fig. II is a vertical sectional view of the device; Fig. III is a vertical sectional view of the lethal chamber equipped with an insect powder distributing device; Fig. IV is a detailed view of the clamping member for holding the dead insect receptacle on the lethal chamber; Fig. V is a similar view of said clamping member at right angles to Fig. IV; Fig. VI is a plan view at 6—6 in Figs. I and II; Fig. VII is a plan view through 7—7 in Figs. I and II; Fig. VIII is a broken sectional view at 8—8 in Figs. I and II; Fig. IX is a plan view of Fig. III; Fig. X is a plan view of the cover of Fig. III showing in dotted lines the electrical insect destroying device; Fig. XI is an elevational view of Fig. III; and Fig. XII is a detailed sectional view of Fig. III showing the lethal chamber equipped with an electrical means for killing insects.

The principal parts of my invention are: The base 1, barrel 2, reservoir 3, funnel 4, baffle disk 5, and lethal chamber 6. The legs 7—7 and hanger 9 secured to the upper ends of said legs 7—7 constitute the base 1 of my device. The reservoir 3 is provided with a flange 10 which is adapted to rest on the hanger 9 and it is secured to the base 1 by a plurality of clips 66. It is also provided with a cover 11 in which there is provided an opening to receive a removable receptacle 12. This receptacle 12 is provided with an annular flange 13 which supports it when resting on the cover 11. The receptacle 12 is also provided with a plurality of vents 14 connecting it with the interior of the reservoir 3, and a convex gauze wire cover 15 which is adapted to extend down into said receptacle 12 and is adapted to prevent the insects from getting into the lower portion of the receptacle 12.

The barrel 2 is cylindrical in shape and is provided with a base portion 41, a gauze screen portion 16, and a removable top portion 17, and is adapted to be mounted on the hanger 9 by a hinge 18 attached at one end to the base portion 41 and at its other end to the cover 11. A hook 19 is mounted on the base portion 41 which is adapted to engage in the eye member 20 mounted on the cover 11, thus providing for securing the barrel 2 to the reservoir 3.

The base portion 41 is provided with a plurality of vents 21 in its lower edge which provides for the ingress of flies or other insects. Mounted in the base portion 41 with its lower end resting on cover 11, is a flattened cone shaped wire screen member 22 which is provided on its base with a plurality of vents 28, and directly above said member 22 and spaced apart from it is a similar screen member 23. Each of the said screen members 22 and 23 have openings 42 at their apexes which permit the passage of the trapped insects from each of said members 22 and 23 into the compartment above and are intended to allow the insects, after entering the said screen members 22 and 23, to pass through the said top openings 42 from one screen member into the member above.

Immediately above and spaced apart from said screen member 23 is the screen gauze funnel 4 mounted in said barrel 2. This funnel 4 is provided with an opening 43 at its apex which provides the passageway for the insects from said funnel 4 into the portion 16 of the barrel 2 above the baffle 5.

This baffle 5 is a metal disk provided on its perimeter with an annular rim 24; it is oval in shape and fits snugly in the barrel 2 with its perimeter resting against the wall of said barrel 2; it is provided near its center with an opening to allow it to fit snugly around the funnel 4 allowing the end of said funnel 4 to extend a considerable distance above it into the portion 16 of said barrel 2 as shown best in Fig. II. This baffle 5 is provided near its one end with an opening 25 which is adapted to connect it with the upper end of a tube 27.

The funnel 4 and the members 22 and 23 are each and all provided with similar openings 26 and are adapted to be placed one above the other so that said openings 26 will be in line with one another and in line with said opening 25 in the baffle 5 to permit the tube 27 to be inserted in said openings 26 and be connected with opening 25 in said baffle 5. Owing to the oval shape of said baffle 5, it is adapted to be placed in an inclined position in the barrel 2 as shown best in Fig. II, to facilitate the passage of the trapped insects from it into the tube 27. This tube 27 extends downwardly from the baffle 5 through an opening in the reservoir 3 to the top of the lethal chamber 6 and is of a sufficient diameter to allow the free passage of the trapped insects down through it into the said lethal chamber 6. This lethal chamber 6 is cylindrical in shape and is provided with a square cover 29, the edges of which extend beyond the wall of the lethal chamber 6 sufficiently to permit said extended edges to engage in lugs 30, which are mounted on the bottom of the reservoir 3 so as to place said lethal chamber 6, when in use, immediately below and in operative connection with said tube 27.

In said lethal chamber 6 is a cylinder 31 which is mounted in the center of the cover 29 and extends downwardly into said lethal chamber 6 to near the bottom thereof, and it is provided with a plurality of air vents $a$ spaced apart a short distance below the screen 34. These air vents $a$ are adapted to cause a current of air to pass upwardly through cylinder 31 and tube 27 to facilitate the ventilation of said cylinder 31 and tube 27. The cylinder 31 is also provided with an annular lug 32. Another annular lug 33 is mounted on the wall of the lethal chamber 6 opposite to said lug 32 and a gauze screen member 34 is mounted on said lugs 32 and 33 to form a receptacle 37 adapted to contain an insect powder which will pass through said screen 34 into a chamber 38 located in said lethal chamber 6 immediately below said screen 34.

A nipple 35 is mounted in the wall of the lethal chamber 6 near the top thereof for the purpose of putting the insect powder into said receptacle 37, and a plug 36 is provided to close the opening in nipple 35. The cylinder 31 opens into the chamber 38 and is in operative connection with the tube 27 as a prolongation of it.

In the wall of the lethal chamber 6 there is provided a plurality of openings 39 into the chamber 38, which said openings are covered with a gauze screen 40 which prevents any live insects in the chamber 38 from escaping and at the same time admits light and air into said chamber 38.

Also mounted on the wall of said lethal chamber 6 at 45 is a hinged support member 46 which is adapted to swing back and forth on the hinge 47. Mounted on the lower end of said member 46 is a spring clamping member 48.

This clamping member 48 is composed of two members 49 and 50 connected by a hinge 51. These members 49 and 50 are curved or bent to conform to the wall of the lethal chamber 6. The member 50 is provided at its end with a spring catch 52 which is adapted to engage with a catch 53 mounted on the end of the member 49 when the extended ends of the members 49 and 50 are pressed together. Said clamping member 48 is mounted on said member 46 at 54 on the member 49.

A sack 55, or other receptacle, of a diameter slightly greater than the diameter of the lethal chamber 6 is adapted to be mounted over the lower end of said lethal chamber 6 between it and the clamping member 48 so that said sack 55 may be securely held in position around said lethal chamber 6 when said clamping member 48 is closed by pressing together the ends 52 and 53 of the members 50 and 49.

The structure hereinbefore described, is one in which I have provided for the destruction of the insects by a powder which is sprinkled or dusted on the insects in the lethal chamber 6 by the jarring of the gauze screen 34 by the insects flying against it when in the chamber 38.

Figure 12:
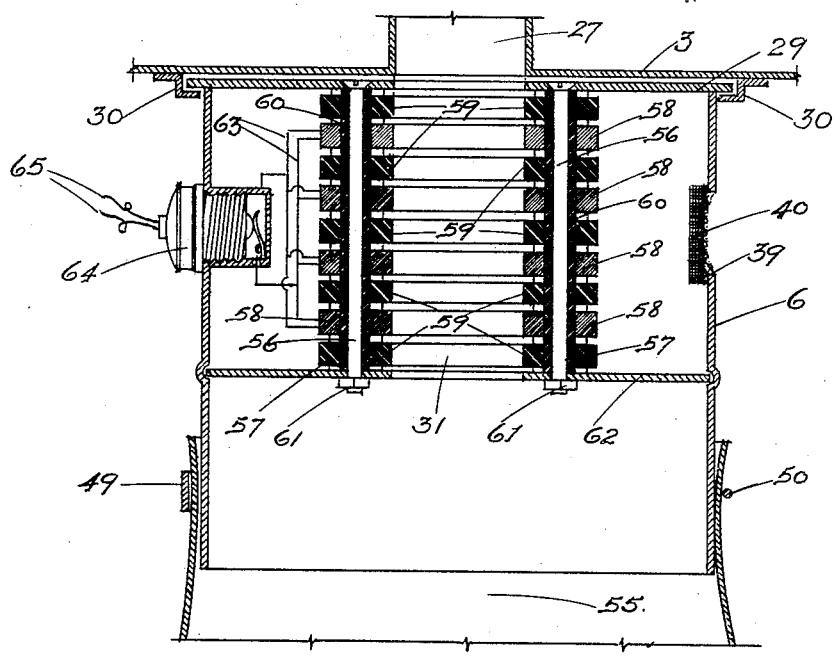

The structure so described is adapted to be used when no electrical current is available. When an electrical current is available for use, I have provided an electrical means for destroying the insects which is adapted to be mounted in the said lethal chamber 6, in the upper part thereof instead of the insect powder receptacle 37. The electrically operated lethal chamber 6 is fully illustrated in Fig. 12 of the drawings.

Mounted in the upper end of the lethal chamber 6 by means of a plurality of bolts 56 is an insect destroying member 57. This member 57 is composed of a plurality of metal plates 58 and a plurality of insulating washers 59 placed alternately one upon the other. Said metal plates 58 and said insulating washers 59 are circular in shape and of the same diameter, and each is provided with a hole in the center thereof of the same diameter as the tube 27. They are also each provided with four holes distributed around said central hole and each of them is of a size to contain the insulating tube 60 and one of said bolts 56. When said metal plates 58 and said insulating washers 59 are assembled by placing them so that the openings in said plates 58 and washers 59 coincide so that an insulating tube 60 and one of the bolts 56 may be inserted into each of said holes, the said member 57 so assembled, may be mounted in said lethal chamber 6 and secured therein by nuts 61 which are adapted to be screwed on said bolts 56 below and against the partition 62 which is mounted near the middle of said lethal chamber 6.

The metal plates 58 are connected by wires 63, which said wires 63 are operatively connected with the outlet plug 64 mounted in the wall of the lethal chamber 6 and said outlet plug 64 is connected by wires 65 which connect with an electrical supply source.

A handle 67 is mounted in the upper portion of the barrel 2 for use in moving the device.

A nipple 68 which opens in the reservoir 3 is mounted in the wall of said reservoir 3 and is provided with a plug 69 which is adapted to close the opening in said nipple 68. This nipple 68 is adapted for filling or draining said reservoir 3.

I have discovered in my study of a plan to destroy insects, and especially flies; that unless a means is provided that will prevent an accumulation of insects in the trap without providing a means for getting rid of the trapped ones, the insects on the outside of the trap will not enter after the trap is filled with flies endeavoring to make their escape.

When flies have entered a trapping device and find that they are confined, they endeavor to escape by ascending and continue to go in that direction as long as the trapping device is not too much crowded with insects; after the insects have passed through the vents in base 41, they pass to chamber 12 following the odor that comes from the contents of chamber 12 and reservoir 3, and not finding what they were seeking, they then attempt to get out of the trap and in doing so, pass upwardly through the opening in the cone 22, into the cone 23 and from thence into the funnel 4 and through the opening 43 into the portion 16 of the barrel 2. By the time they have reached the portion 16 the insects have become tired from working their way through the different chambers and are ready to crawl around in the chamber 6 hunting for an exit, and on alighting or crawling on the disk 5, they follow the annular rim 24 on said disk which finally leads them to the opening 25 and into the tube 27, and finding a current of air coming through the tube 27, they follow it, down into the lethal chamber 6, which is well lighted and ventilated through the vents 39. After reaching the chamber 38 in lethal chamber 6, the insects that are able to fly will attempt to get out of said chamber 38 and will fly against the screen 34 causing the insect powder in chamber 37 to sift through the screen 34 on to the insects, killing or crippling them so that they drop into the receptacle 55. The insects that are unable to fly when they reach the chamber 38 will be destroyed by the insect powder released through the screen 34, as they cling to the wall of the chamber 38 or have fallen into the receptacle 55.

In operating my invention, an aromatic solution which lures insects is poured into the receptacle 12 and allowed to pass through the openings 14 until the reservoir 3 is partially filled, and placing a supply of a fine poisonous insect powder in chamber 34 of lethal chamber 6. The odor from the liquid in the reservoir 3 attracts the insects which enter through the vents 21 into the cone 22 and from thence the insects pass through the vents 28 into the cone 23 and from thence into the funnel 4 and from the funnel 4 into the chamber 16 above the baffle 5. As the insects proceed from one chamber to the other in search of the source of the odor, they become tired and a great many of them crawl on the walls of the device in their efforts to escape from the device. After the insects get into the chamber 16 they follow the baffle 5 down through the opening into the tube 27 thence through the cylinder 31 into the chamber 38 of the lethal chamber 6. The chamber 37 of the lethal chamber 6 is provided with a light, fine poisonous powder which kills the insects by dropping upon them, and this powder is released from the chamber 37 through the screen gauze bottom 34 by the striking of the flies against said bottom 34; and this powder falls on the insects either flying or crawling in the chamber 38, thereby killing them or disabling them so that they drop into the sack 55 or other receptacle.

In case electricity is used as the destroying element, the insects pass out of the tube 27 into the passageway in the member 57 where they come in contact with two or more of the metal plates 58 which are charged with electricity, thus killing or disabling the insects so that they will drop out of said member 57 into receptacle 55, which said receptacle 55 may be removed by releasing the member 48.

Having thus described my invention, what I claim is:

1. An insect destroying device consisting of a base member, a reservoir mounted in said base member, a barrel member hinged on said base member provided in its base portion with a plurality of vents spaced apart radially and having mounted in it a plurality of flattened cone members with exit openings spaced apart one above the other, a funnel mounted in said barrel above said flattened cones, an inclined baffle with an outlet opening therein mounted in said barrel around the end of said funnel, a tubular insect passageway having its one end connected with the opening in said baffle and its other end operatively connected with an insect destroying member, mounted in said barrel, an insect destroying member mounted on the bottom of said reservoir and operatively connected with said tubular passageway, a cap member mounted on the upper end of said barrel and a handle means mounted on the upper end of said barrel below said clamp member.

2. A device of the kind described comprising a base member, a reservoir mounted on said base member, a barrel member provided with a base with inlet vents and a plurality of flattened cones the lower one of which is provided with a plurality of inlet vents mounted in said last named base, a funnel mounted in said barrel above said base, an inclined baffle mounted on said funnel in said barrel, an insect destroying member provided with a poisonous powder chamber with a gauze wire bottom, an insect chamber adjacent to said gauze wire bottom provided with an outlet or passageway for insects through said insect powder chamber into said insect chamber mounted below said gauze wire bottom on said first mentioned base member, and a means for the passage of insects from said baffle into said insect destroying chamber mounted in said barrel and said reservoir in operative connection with said insect destroying member.

3. A device of the kind described comprising a base member, a reservoir mounted in said base member, a barrel member provided with a base with inlet vents and a plurality of flattened cones the lower one of which is provided with a plurality of inlet vents mounted in said last named base, a funnel mounted in said barrel above said base, an inclined baffle mounted on said funnel in said barrel, an electrically operated lethal chamber provided with an electrical insect destroyer composed of alternate layers of metal plates and insulating washers, said metal plates being electrically connected with one another and with an electrical supply source securely mounted in the cover of said lethal chamber, and a means adapted for the passage of insects from said barrel into said electrically operated lethal chamber.

4. An insect destroying device provided with a base, a reservoir mounted on said base, a barrel member provided with a plurality of cone-shaped insect conducting members superposed apart from each other and an inclined disk provided with an outlet placed above said conducting members mounted in the lid of said reservoir, a lethal chamber mounted on the said insect destroying device and an insect passage way operatively connecting the outlet in said disk with said insect destroying device.

5. The combination in an insect destroying device consisting of a base member, a reservoir, a barrel member provided with a plurality of superposed cones, and an inclined disk provided with an outlet, of a lethal chamber, a powder chamber mounted in said lethal chamber, and a passage way for insects connecting said lethal chamber with the outlet in said disk.

6. The combination in an insect destroying device consisting of a base member, a reservoir, a barrel member provided with a plurality of superposed cones, all operatively connected and an inclined disk provided with an outlet, of a lethal chamber, an electrically operated insect killing device consisting of a plurality of metal plates and a plurality of insulating members superposed alternately one upon the other mounted in said lethal chamber, wires operatively connecting said metal plates with one another, mounted in said lethal chamber, and a means for connecting said wires with an electrical supply source.

CHARLES L. JACKSON.